Dec. 31, 1929.                C. M. RASMUSSEN                1,741,878
                           TRACTOR TRACK INCLOSURE
                           Filed Feb. 8, 1926         2 Sheets-Sheet 1
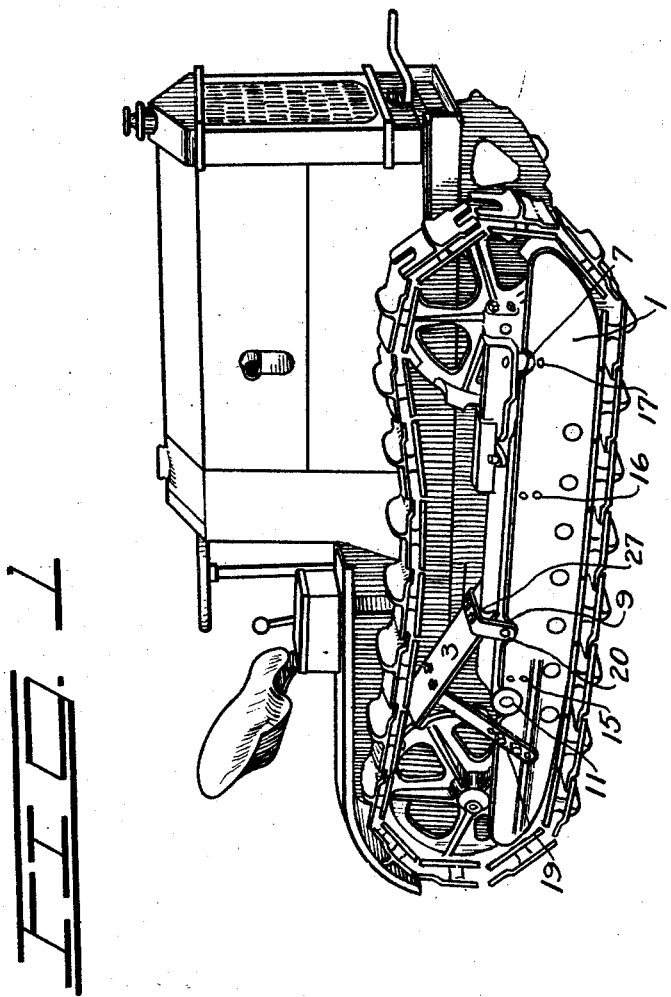
Inventor
Charles M. Rasmussen
By Harry Bowen
Attorney

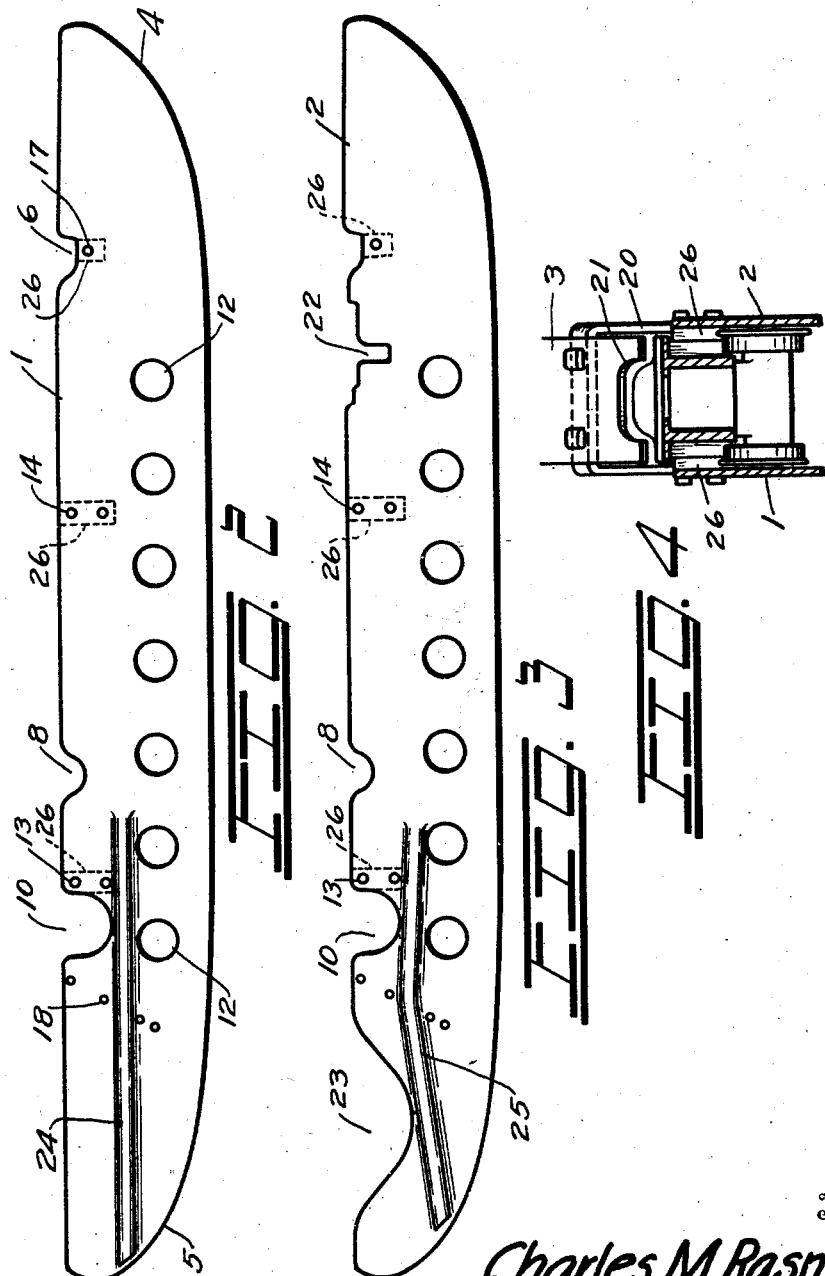

Patented Dec. 31, 1929

1,741,878

UNITED STATES PATENT OFFICE

CHARLES M. RASMUSSEN, OF SEATTLE, WASHINGTON

TRACTOR-TRACK INCLOSURE

Application filed February 8, 1926. Serial No. 86,724.

The invention is a design for the lower portion of a tractor track inclosure which positively prevents rocks, dirt or refuse working in between the track and the track wheels or sprockets.

The object of the invention is to provide means for positively preventing rocks, dirt or refuse working in between the track and wheels of a tractor track.

Another object of the invention is to provide an inclosure for a tractor track frame which may readily be applied to the frame.

A further object of the invention is to provide an inclosure for a tractor track frame which will readily replace the plates with which the tractor track frame is provided.

And a still further object of the invention is to provide an inclosure for the lower portion of tractor track frames which is easily applied and which is of a simple and economical construction.

Other features and advantages of the invention will appear from the following description taken in connection with the drawings, wherein:

Figure 1 is a side view of a tractor showing the plate on the outer side of the track as it would appear in use.

Figure 2 is a detail view showing the outer plate.

Figure 3 is another detail view showing the inner plate for the track frame on the opposite side of the tractor.

Figure 4 is a cross section through the inclosure looking toward the rear.

In the drawings I have shown my device as it would be made, wherein numeral 1 indicates the outer plate, numeral 2 the inner plate, and numeral 3 the diagonal baffle plate.

The outer plate 1 is made as shown in Figure 2, and is provided with a curve as indicated by the numeral 4, at the forward end to engage the inner portion of the tractor track, and a curve as indicated by the numeral 5 at the rear which will also approximately engage the inner portion of the tractor track. The lower edge will engage the track continuously as shown in Figure 1 so that the track will be rigidly held at the lower side, or where the load is applied. The upper edge of the plate is provided with a recess 6 which will fit around a lug 7 on the frame, another recess 8 which will fit around a hub 9 on the frame, and another recess 10 which will fit around a hub 11 on the frame. The plate is also provided with a plurality of openings 12 through which the ends of the intermediate roller shafts may project, and also openings 13 and 14 by which the plate may be bolted to projections on the frame by bolts 15 and 16. Below the notch 6 is another bolt hole 17 by which the forward end of the plate is also held to the frame and adjacent the rear of the plate are a plurality of holes 18 through which a brace 19 on the baffle plate 3 may be adjustably held. The lower end of the baffle plate 3 is bolted to a yoke 20 which in turn is bolted to the hub 9 of the frame, and the central portion of the baffle plate is recessed as shown at the point 21 in Figure 4 so that it will clear the oil pan in the frame cover.

The plate 2 is exactly similar to the plate 1 except that it is provided with an additional notch 22 adjacent the forward end to clear the truss member of the frame and also an opening 23 to fit around the differential housing, and to provide for spring action so that it will not break the housing.

The plate 1 is provided with a reinforcing rib 24 as shown in Figure 2, and the plate 2 is provided with a substantially similar rib as indicated by the numeral 25 to reinforce the rear ends of the plates. The plates are also provided with spacers behind the bolt holes 13, 14 and 17 and as indicated by the numeral 26 and shown in dotted lines in Figures 2 and 3, which will space the upper edges of the plates the correct distance from the frame as shown in Figure 4.

It will be understood that changes may be made in the construction without departing from the spirit of the invention. One of which changes may be in the exact design of the plates or in the arrangement of any of the openings therein; another may be in the use of other means for attaching the plates to the frame, and still another may be in the design or arrangement of the baffle plate 3.

The construction will be readily understood from the foregoing description. To use the device the plates may be readily attached to the sides of the frames so that they will engage the upper edge of the lower portions of the track as hereinbefore described, and it will be observed that when in place they practically close the opening along the lower portion of the track so that it will be practically impossible for dirt, rocks or refuse to work into the space between the track and frame or rollers and wheels. The baffle plate 3 may also be adjusted to such a position that it will catch rocks, dirt or refuse as they drop from the under side of the chain as it leaves the top of the rear sprocket wheel.

Having thus fully described the invention what I claim as new and desire to secure by Letters Patent, is:

In a tractor frame structure having an idler sprocket at the front end, a driving sprocket at the rear end, an endless track trained about said spockets, and a housing for the lower stretch of said track intermediate the sprockets comprising a pair of side plates and a top plate, the combination with said housing of a fender plate pivotally mounted at one end on top of said housing and inclined upwardly therefrom toward said driving sprocket to deflect dirt falling from the upper stretch of said track, and a pair of arms extending downwardly from said fender plate and adjustably secured to said side plates.

In testimony whereof he affixes his signature.

CHARLES M. RASMUSSEN.